United States Patent [19]

Hendricks et al.

[11] Patent Number: 5,075,605
[45] Date of Patent: Dec. 24, 1991

[54] INNER-ROTOR COMMUTATION DEVICE

[75] Inventors: Howard F. Hendricks, Schwenksville; Frank S. Nolt, Elverson, both of Pa.

[73] Assignee: Penn Engineering & Manufacturing Corp., Danboro, Pa.

[21] Appl. No.: 607,733

[22] Filed: Nov. 1, 1990

[51] Int. Cl.$^5$ .............................................. H02K 29/08
[52] U.S. Cl. ..................................... 318/133; 310/156; 323/368
[58] Field of Search ....................... 318/133, 138, 254; 310/156; 323/368

[56] References Cited

U.S. PATENT DOCUMENTS

| | | | |
|---|---|---|---|
| 3,162,804 | 9/1961 | Parsons | 323/368 |
| 4,311,933 | 1/1982 | Riggs et al. | 310/153 |
| 4,430,603 | 2/1984 | Müller | 318/138 |
| 4,494,028 | 1/1985 | Brown | 310/156 |
| 4,529,918 | 7/1985 | Müller | 318/138 |
| 4,554,473 | 11/1985 | Müller | 310/67 |
| 4,686,400 | 8/1987 | Fujisaki et al. | 310/156 |
| 4,724,346 | 2/1988 | Klein et al. | 310/156 |
| 4,731,554 | 3/1988 | Hall et al. | 310/156 |
| 4,803,389 | 2/1989 | Ogawa et al. | 310/152 |
| 4,894,572 | 1/1990 | Shisaki | 310/156 |
| 4,970,422 | 1/1990 | Lind | 310/156 |
| 4,988,273 | 1/1991 | Faig et al. | 318/138 |

FOREIGN PATENT DOCUMENTS

| | | | |
|---|---|---|---|
| 1563009 | 5/1972 | Fed. Rep. of Germany | 310/156 |
| 3028747 | 3/1982 | Fed. Rep. of Germany | 318/138 |
| 3331754 | 3/1984 | Fed. Rep. of Germany | 318/138 |
| 0159960 | 12/1981 | Japan | 318/254 |
| 0170391 | 7/1989 | Japan | 310/156 |

Primary Examiner—Steven L. Stephan
Assistant Examiner—Thomas M. Dougherty
Attorney, Agent, or Firm—Gregory J. Gore

[57] ABSTRACT

A brushless DC motor includes a rotor having an iron core affixed to a motor shaft. Permanent magnets are affixed to the core and separated by aluminum inserts which are keyed to the core. An annular groove in one end of the rotor core is dimensioned so that its outer diameter coincides with the inner tips of the aluminum inserts. The inner diameter of the groove and its depth provide only minimal clearance around commutation transistors which occupy the space within the groove. The commutation transistors are affixed and electrically connected to a circuit board which, in turn, is secured to the motor body by attachment to a removable motor end plate. With this structure, the commutation transistors are surrounded on three sides by the rotor and are triggered by its drive magnets. This structure permits the commutation transistor to be triggered by a strong magnetic flux which is more accurately directed through the transistor at its switch plane.

5 Claims, 4 Drawing Sheets

FIG. 1
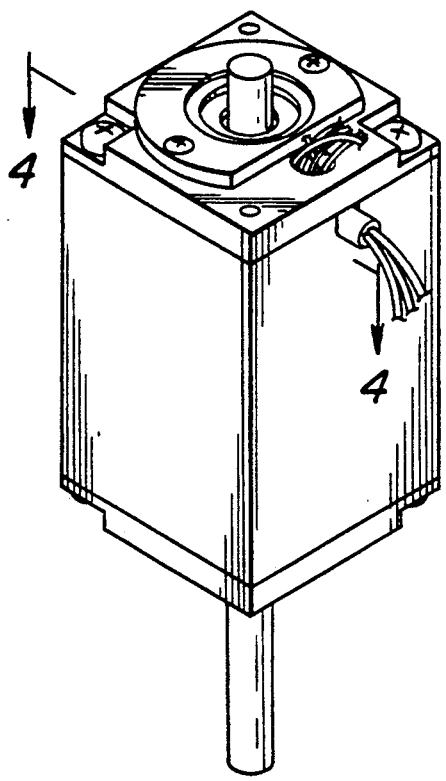
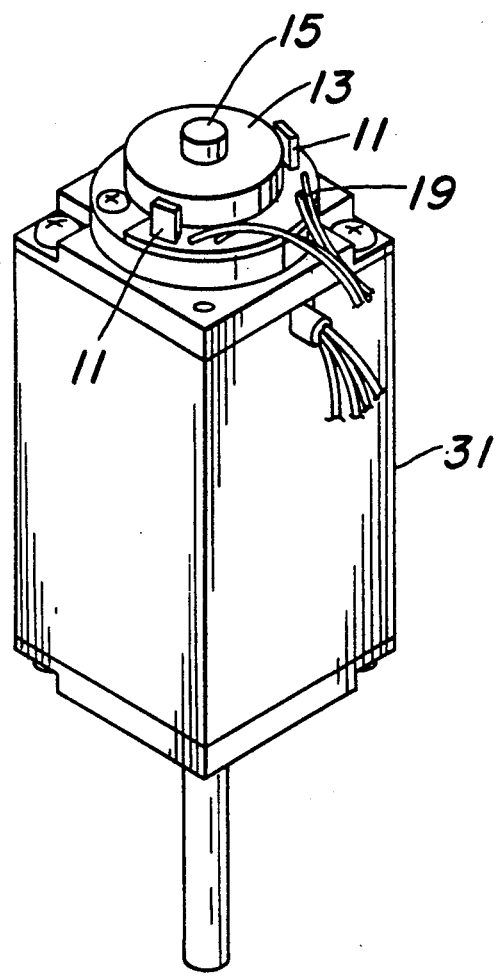
FIG. 2
PRIOR ART

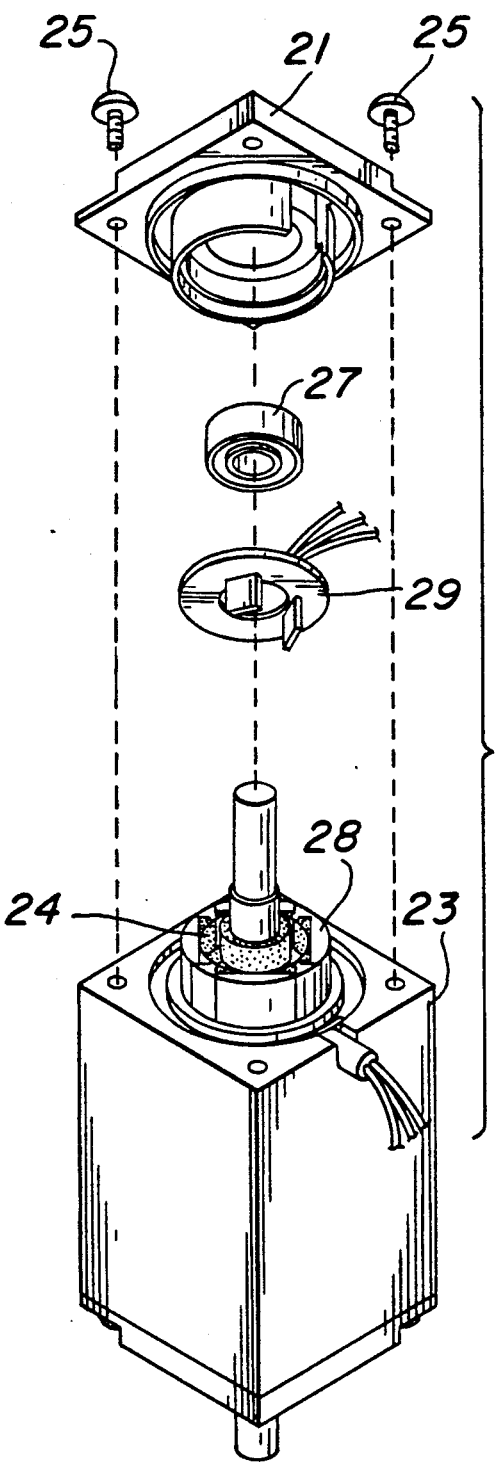
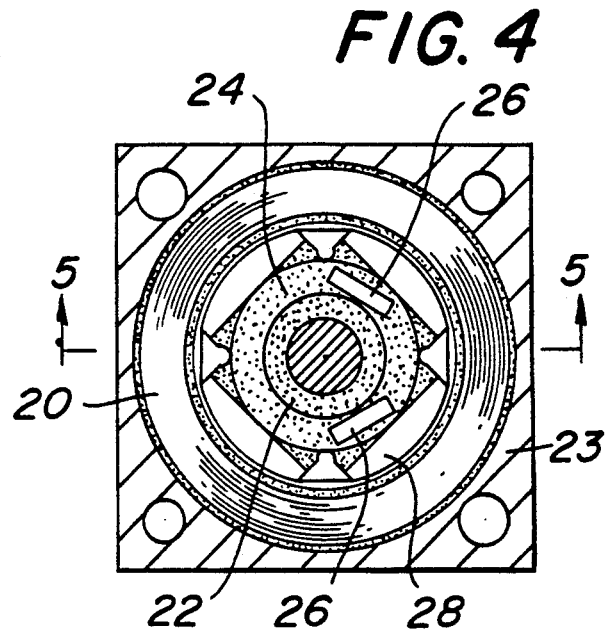
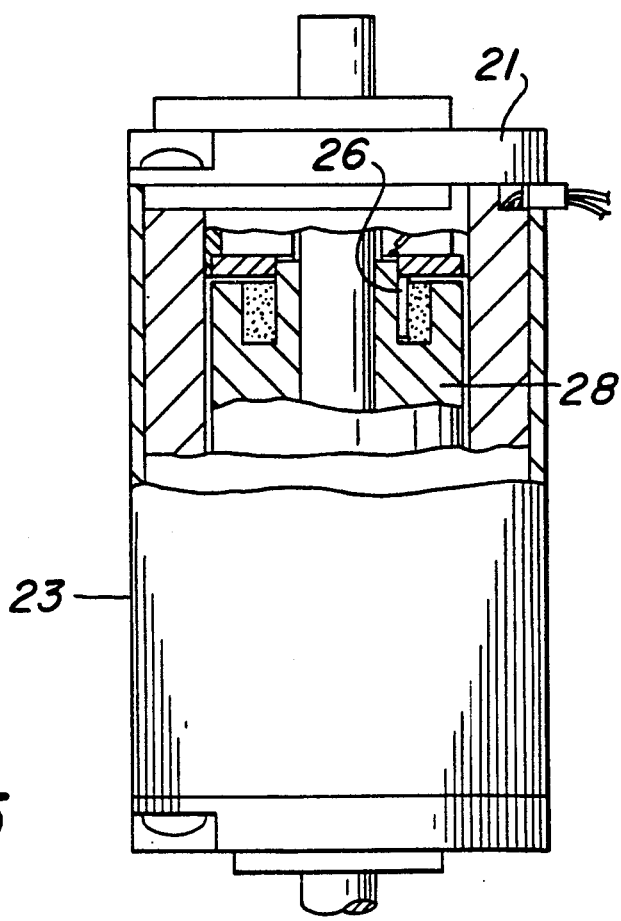
FIG. 3
FIG. 4
FIG. 5

SWITCH PLANE

SWITCH PLANE

INNER-ROTOR COMMUTATION DEVICE

FIELD OF THE INVENTION

This invention relates to the contrustion of a permanent magnet rotor in a brushless C motor which functions in concert with commutation switching devices, such as Hall transistors.

BACKGROUND OF THE INVENTION

In direct current motors, a commutation system is employed which changes the current flow in the stator windings at specific points in the rotor rotation in order to create a rotating magnetic field in the area surrounding the rotor to create the motor's torque. This commutation, or electrical switching, must being synchronization with and in leading angular relationship with the permanent magnets of the motor.

In a typical brushless DC motor, the permanent magnets are placed on the rotor and coils (windings) are int eh stator, Commutation switching to the coils is preformatted by amplified current signals originating at magnetically energized electronic switches, known as Hall effect transistors. When these transistors are exposed to magnetic flux, they alternately toggle "on" or "off" depending on the direction of the magnetic flux passing through its.

Prior art switching transistors 11 as shown in FIG. 2 are positioned around and mounted stationary about the outer periphery of an auxiliary magnet 13 which is fixed to the end of the motor shaft 15. Since the rotor magnets and the auxiliary magnet share a common shaft, the necessary synchronization and angular relationship is maintained. However, as shown in FIG. 6a, the flux pattern of the auxiliary magnet in the prior art device at its theoretical switch point is changing tangent to the desired transistor plane and is therefore indefinite and lies within the "dead band" response of the transistor 11. In addition, any mismatch of field strength of the auxiliary magnet 13 would tilt this flux pattern. The resulting error in switching point effects the angular relationship of the rotating magnetic field with respect to the rotor magnets. This results in an ultimate loss of smoothness of the interaction of the two fields, resulting in both "cogging" and loss of torque. Furthermore, the use of an auxiliary magnet at the end of the rotor shaft requires an additional magnetic structure and increases the overall length of the motor.

Prior art of which the applicant is aware and is pertinent to the present invention are U.S. Pat. No. 4,311,933, entitled "Brush Direct Current Motor", issued to Riggs et al on Jan. 19, 1982; and U.S. Pat. No. 4,494,028, entitled "Integral Coaxial Commutation and Rotor Magnets and Apparatus and Method for Making Same", issued to Brown on Jan. 15, 1985. The disclosures of both of these references are pertinent in that they show inverted-type motors where the stator and switching transistors are within the rotor structure. However, the commutation Hall transistors employed are triggered by auxiliary commutation magnets and there is no groove in the rotor. Furthermore, there is no rotor structure on the opposite side of the Hall transistor to concentrate and direct the magnetic flux disclosed in either reference.

SUMMARY OF THE INVENTION

In order to overcome the problem described above and to enhance the accuracy of commutation switching transistors in a brushless DC motor, the present motor has been devised. Except for the rotor structure and the positioning of the Hall-type switching transistors, the present motor is otherwise conventional. The rotor consists of an iron core affixed to the motor shaft and permanent magnets are affixed to the core positioned and separated by aluminum inserts keyed to the core.

The rotor structure departs from the prior art in that it includes an annular groove in one end of the rotor core, which is dimensioned so its outer diameter coincides with the inner tips of the aluminum inserts. The inner diameter of the groove and its depth provides only minimal clearance around the switching transistors which occupy the space within the groove. The transistors are affixed and electrically connected to a circuit board which, in turn, is fixed to the stator by attachment to a removable end plate. With this structure, the transistors are surrounded on three sides by the rotor and are subjected to its magnetic flux.

As will be more fully described herein, this structure permits the switching transistor to be activated by a much stronger magnetic flux which is more precisely directed through the transistor at its switch plane. Furthermore, the Hall transistor is isolated from other possible outside magnetic disturbances because it lies within, and is shielded by, the rotor. Also, since the commutation elements are mounted within the rotor, rather than on the end of the shaft, the overall length of the motor is reduced and fewer parts are required.

It is therefore an object of the present motor to produce a commutation switching system which is more accurate, producing enhanced motor performance with less torque ripple.

It is a further object of the present device to produce a more compact DC brushless motor which has fewer parts and which is less susceptible to external electrical and magnetic disturbances.

In order to achieve the above objects, a DC brushless motor has been devised having a rotor with permanent-type drive magnets and stator coils surrounding said rotor, comprising:

a) a motor body containing stator coils;

b) a rotor rotatably secured to said motor body and further including a core having a plurality of permanent-type drive magnets affixed to its periphery;

c) an annular groove located in one end of said rotor, said groove formed in said core portion of said rotor; and d) a plurality of commutation transistors rigidly mounted to said motor body located with minimal clearance within said groove, said transistors being excited solely by the magnetic field of the same rotor magnets which drive the motor, said magnetic field being concentrated and directed through said transistor by the core material on the opposite side of said transistor.

Other objects and advantages of the present device will be more fully understood by the following figures of drawing and description of the preferred embodiment.

DESCRIPTION OF THE DRAWINGS

FIG. 1 is a top front isometric view of the present device.

FIG. 2 is a top front isometric view of the prior art motor having an external commutation system.

FIG. 3 is an exploded isometric drawing showing the novel rotor structure and positioning of the switching transistors.

FIG. 4 is a top sectional view taken from FIG. 1 as shown in that figure.

FIG. 5 is a cutaway sectional view taken from FIG. 4 as shown in that figure.

DESCRIPTION OF THE PREFERRED EMBODIMENT

Figure 6A:
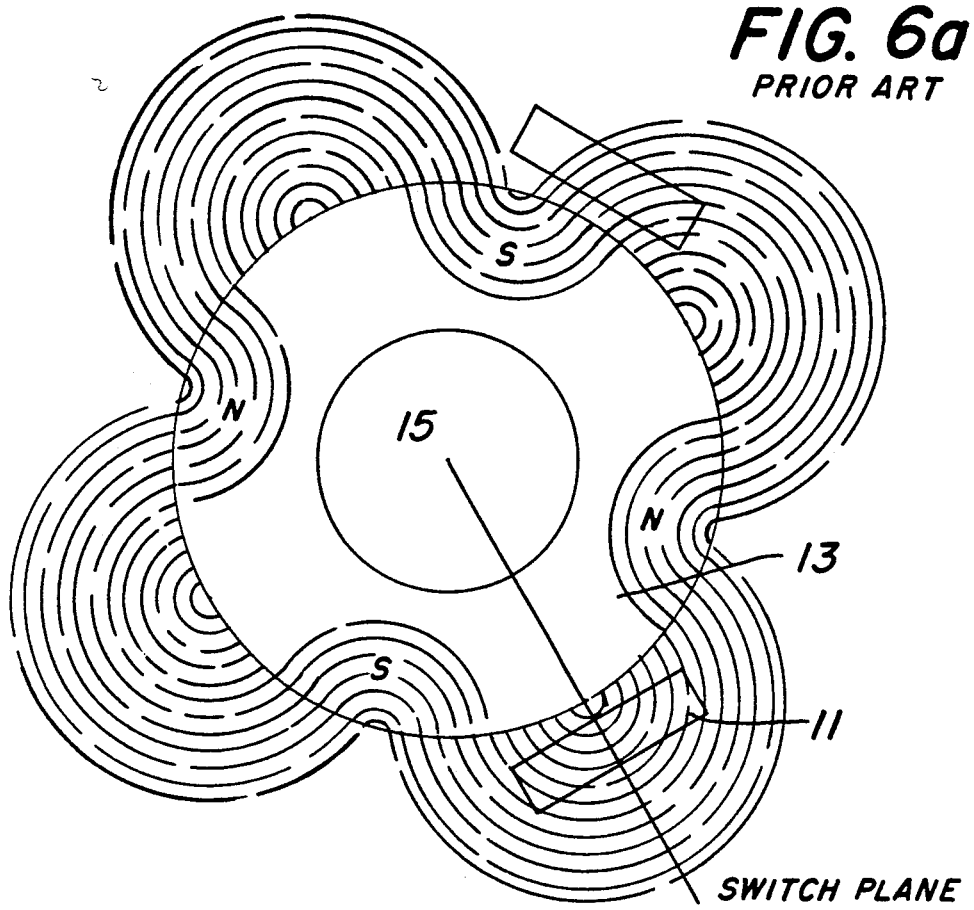
FIG. 6a and 6b are diagrams which show the magnetic flux lines through the switching transistors of the prior art and of the present device respectively.

Referring to FIGS. 1 and 2, the external appearance of the present motor can be compared with that of the prior art motor shown in FIG. 2. The prior art motor includes an auxiliary commutation magnet 13 mounted on the end of the motor shaft 15 external to the body 31 of the motor. The Hall transistors 11 and circuit board 19 are mounted to the outside of the end plate of the motor. Commutation elements of the present invention shown in FIG. 1 are mounted within the motor case and provide a shorter, more compact motor and physical protection for the electronic commutation components.

Referring now to FIG. 3, an exploded assembly drawing of the present invention is shown. The end plate 21 is removable from the motor body 23 by screw fasteners 25. The shaft end bearing 27 is held within the end plate to which the Hall transistors with circuit board 29 is also mounted internally. The rotor 28 contains magnets and an iron core with an annular groove 24 in the end for receiving the Hall transistors.

Figure 8:
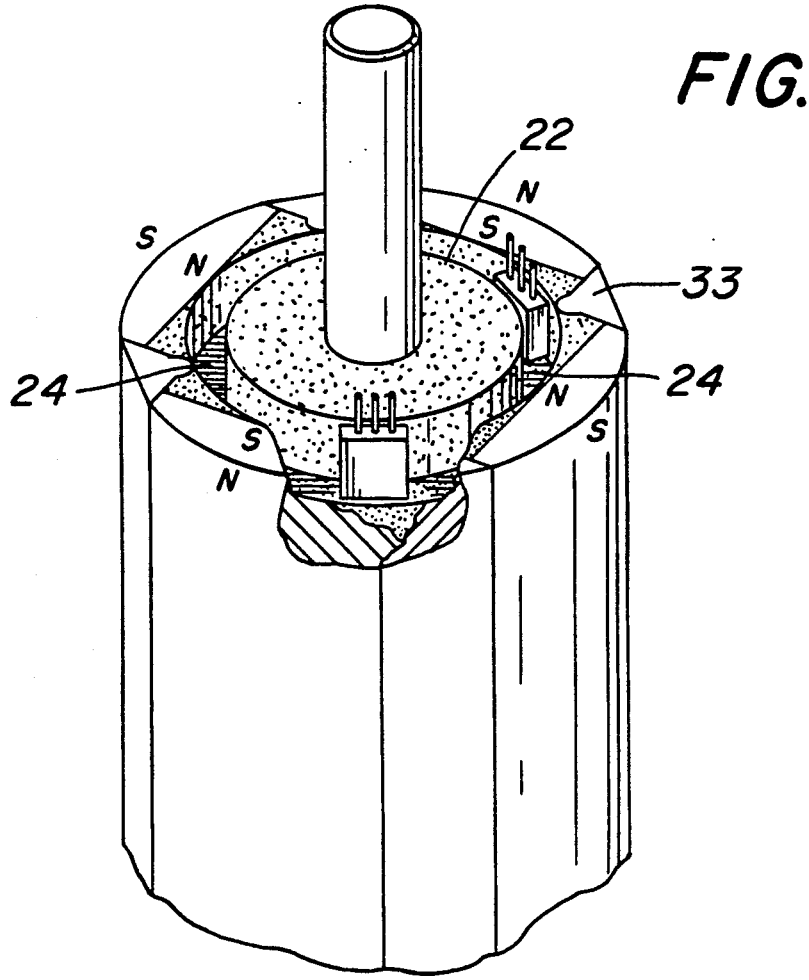
FIG. 8 is a top and side isometric view of the rotor and switching transistors.

As more clearly shown in FIG. 4, the Hall transistors 26 fit closely within this groove between a central portion of the rotor core 22 and the externally-mounted rotor drive magnets 28. Stator coils 20 are secured to the motor body 23 and are spaced from the rotor by a small air gap. FIG. 5 is a side cutaway view showing greater detail and orientation of the various motor structures. As can be seen more clearly in this figure, the Hall transistor 26 is surrounded on three sides by rotor 28. FIG. 8 shows yet greater detail of the rotor structure. The Hall effect switching transistors 26 are positioned in groove 24. The rotor magnets 28 are positioned mechanically by aluminum inserts 33 which are keyed into the iron core 22 of the rotor.

Figure 6B:
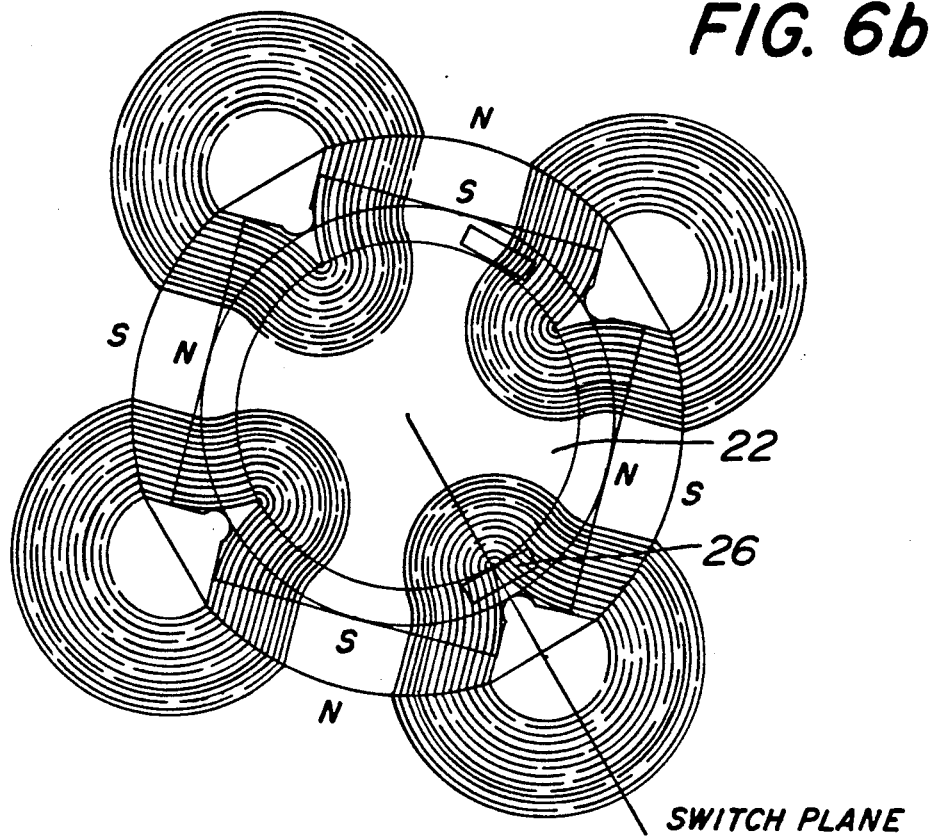

FIGS. 6a and 6b compare the theoretical magnetic flux pattern between the prior art and the present invention respectively. The magnetic flux pattern shown in FIG. 6a shows a weak magnetic flux generated by a small auxiliary magnet which is directed at angles through the Hall transistor 11 switch plane. The pattern shown in this figure results from the conventional arrangement using the auxiliary commutation magnet 13 mounted on the end of the motor shaft 15 with externally-mounted Hall transistors as depicted in FIG. 2.

FIG. 6b depicts the magnetic flux pattern which excites the Hall transistors of the present invention. Here the rotor drive magnets which have a much stronger magnetic field than the smaller prior art auxiliary magnet shown in FIG. 6a are employed as the commutation magnets. Furthermore, because of the rotor core's ferro-magnetic material 22 on the opposite side of the switching transistor 26, the magnetic path depicted by flux lines is concentrated and directed through the transistor parallel to its switch plane. In this figure, the rotor is positioned at its theoretical switch point and it can be seen from this figure that a small degree of rotor movement will change the direction of strong magnetic flux lines through the switch plane of the Hall transistor 26 from one direction to the opposite direction.

A Hall transistor toggles on and off when the direction of the magnetic flux lines change direction at the switch plane. Thus, when comparing the configurations of 6a and 6b, it will be readily understood that the present device provides much more accurate switching of the Hall transistor by the increase in field strength and the more properly directed magnetic flux through the transistor at the theoretical switch point of the rotor. It is an important feature of this invention that ferro-magnetic core material is located behind the Hall transistor and, therefore, the triggering magnetic circuit is completed with less reluctance. This concentrates and directs the magnetic flux perpendicular to the orientation of the transistor and parallel to its switch plane.

Figure 7:
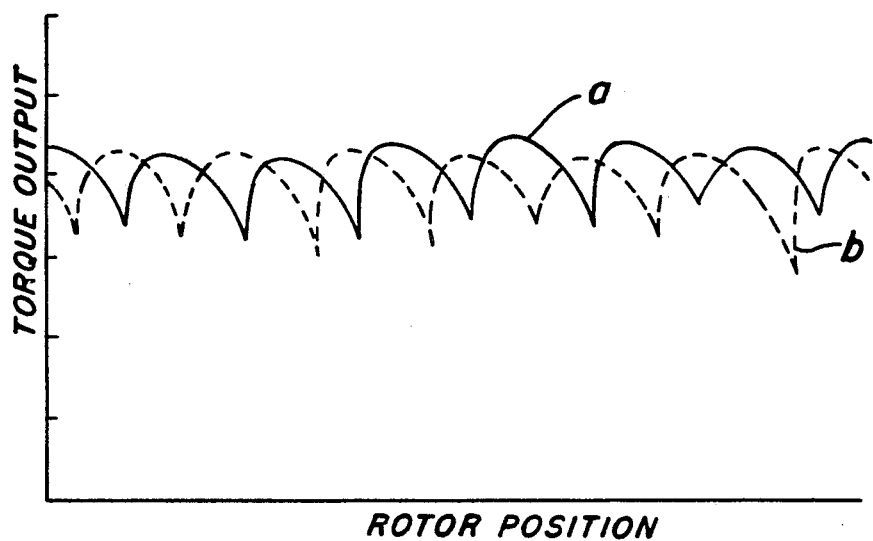
FIG. 7 is a graph comparing the torque output versus rotor position of the present invention compared to prior art devices.

Referring now to FIG. 7, this graph shows torque output versus angular rotor position plots of the present invention and the torque output of the prior art devices. It can be seen that plot a (solid line) of the present invention shows a more even delivery of torque than plot b (dotted line) of the prior art. This enhanced performance is achieved by the more accurate commutation. A higher average torque output of the present device can also be observed. Another important benefit of the present invention is that the Hall transistors are much less susceptible to outside magnetic disturbances because they are shielded by the rotor structure which surrounds them.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A DC brushless motor having a rotor with permanent-type drive magnets and stator coils surrounding said rotor, comprising:
   a) a motor body containing stator coils;
   b) a rotor rotatably secured to said motor body and further including a core having a plurality of permanent-type drive magnets affixed to its periphery;
   c) an annular groove located in one end of said rotor, said groove formed in said core portion of said rotor; and
   d) a plurality of switching transistors rigidly mounted to said motor body and locate with minimal clearance within said groove, said transistors being excited solely by the magnetic field of the same rotor magnets which drive the motor, said magnetic field being concentrated and directed through said transistor by the core material on the opposite side of said transistor.

2. The motor of claim 1 wherein said core is composed of a ferro-magnetic material.

3. The motor of claim 2 wherein said core is iron.

4. The motor of claim 3 wherein said switching transistors are Hall effect type transistors.

5. The motor of claim 4 wherein said Hall effect transistors are rigidly mounted to the inside of a removable end plate which is releaseably secured to said motor body.

* * * * *